United States Patent
Sandstrom (10) Patent No.: US 7,136,169 B2
(45) Date of Patent: Nov. 14, 2006

(54) ETALON TESTING SYSTEM AND PROCESS

(75) Inventor: Richard L. Sandstrom, Encinitas, CA (US)

(73) Assignee: Cymer, Inc., San Diego, CA (US)

( * ) Notice: Subject to any disclaimer, the term of this patent is extended or adjusted under 35 U.S.C. 154(b) by 119 days.

(21) Appl. No.: 10/699,228

(22) Filed: Oct. 30, 2003

(65) Prior Publication Data

US 2004/0109167 A1 Jun. 10, 2004

Related U.S. Application Data

(60) Provisional application No. 60/423,339, filed on Oct. 31, 2002.

(51) Int. Cl.
*G01B 9/02* (2006.01)

(52) U.S. Cl. ..................... 356/519; 356/506
(58) Field of Classification Search ............... 356/454, 356/506, 519, 512, 513, 514, 515
See application file for complete search history.

(56) References Cited

U.S. PATENT DOCUMENTS

| | | | | |
|---|---|---|---|---|
| 4,969,744 A | * | 11/1990 | Ordell | 356/510 |
| 6,813,081 B1 | * | 11/2004 | Shiono | 359/577 |
| 6,819,438 B1 | * | 11/2004 | Neily et al. | 356/632 |

* cited by examiner

*Primary Examiner*—Gregory J. Toatley, Jr.
*Assistant Examiner*—Marissa J. Detschel
(74) *Attorney, Agent, or Firm*—William C. Cray (57) ABSTRACT

The present invention provides a relatively simple etalon testing system and process for measuring cavity error of etalons to high precision. It works equally well on solid and air-spaced designs. This invention should be a great aid in the manufacture of high performance etalons, separating out the geometric and reflectivity finesses. The present invention permits measurement of etalon spacings to an accuracy of better than $\lambda/1000$ (i.e., about 63 picometers [$6.3\times10^{-11}$ m] when using a HeNe test laser). In a preferred process an etalon under examination is mounted on a rotational stage illuminated with a collimated beam from a HeNe laser. Reflections from the etalon are imaged on a screen to produce interference fringes which are monitored by a CCD camera. The etalon is then pivoted about an axis perpendicular to the laser beam and images of the interference patterns are recorded periodically to produce a plot of intensity vs. pivot angle over a pivot range sufficient to include at least one extinction cycle. (Extinction occurs when the etalon is positioned at such an angle that interference in the etalon causes almost complete extinction of the reflected beam). The interference pattern, as a function of pivot angle, are then analyzed to determine the etalon spacing.

10 Claims, 6 Drawing Sheets
(4 of 6 Drawing Sheet(s) Filed in Color)

Mask diameter = 9.8113mm
Spherical curvature over mask area: 0.0023042 waves 1.4581nm
Cavity wedge: 0.03534 waves/cm 22.363nm/cm
Wedge neutral axis: 21.238 degrees

ETALON TESTING SYSTEM AND PROCESS

This application claims priority to U.S. Ser. No. 60/423,339, filed on Oct. 31, 2002 of which is incorporated herein by reference. This invention relates to etalons and in particular to processes used to control etalon spacings and systems and processes used to test etalons.

BACKGROUND OF THE INVENTION

A well-known method of making accurate wavelengths and bandwidth measurement of laser beams is to use an etalon (also called a Fabry-Perot etalon). In a typical etalon two very flat transparent plates are held close together rigidly in place with three precision quartz or Invar spacers sandwiched between the two plates defining the spacing between the plates. The finesse of an etalon is determined by the fringe patterns it produces (on an intensity vs. frequency or wavelength plot) and is defined as the ratio of the free spectral range (the distance between the fringes) to the width of the fringes (at half maximum). A diffuse laser beam passing through the plates will produce interference patterns. In laser systems the patterns are sometimes measured using a linear fast photodiode array such as a 1024 pixel array. The array, appropriate optical equipment and a fast digital processor can be used to monitor the spectral information in each pulse of a 4,000 Hz laser beam and calculate the wavelength and bandwidth for each pulse. Accuracy of these measurements is very important since the laser beam is used as a light source for integrate circuit fabrication where feature sizes are as small as few hundred nanometers. The interference pattern can be projected onto a screen and viewed visually. Alternatively, the pattern can be focused onto a detector array such as pixels of a CCD camera.

In some cases because of errors in etalon fabrication processes or other reasons, the spacing between the plates of the etalon is not uniform. This affects the resolving capabilities of the etalon. Small errors in the spacing are difficult to measure using conventional measurement techniques.

The manufacture of an air-spaced etalon proceeds as follows: (1) the individual etalon plates are polished flat and tested using a conventional Fizeau interferometer; (2) the plates are coated with high reflective coatings for the desired wavelength and usually re-tested for flatness; (3) three matched, ultra-precision spacers are selected; (4) the two etalon plates and three spacers are optically contacted into a single assembly. While the coated plates may be relatively flat within the central clear aperture, the forces involved in the optical contacting process, plus edge rolloff in the plates, have the potential to degrade the parallelism of the assembly. In addition, there are limits to how precisely the thickness of the three spacers can be verifiably matched prior to assembly.

In a conventional interferometer, an etalon cavity is formed between a Fizeau reference flat and the test surface. An expanded, highly collimated beam from an single-mode He—Ne laser is reflected from this combination and captured by a camera. During a measurement sequence, the spacing between the reference flat and test surface is varied by about a half-wavelength by translating the reference flat with PZT actuators. Typically 5–10 steps are taken over the half-wavelength translation. The resulting interference patterns are captured by the camera, analyzed, and the phase of the interference extracted for each point on the test optic. Since the wavelength of the light is precisely known, the physical shape of the test surface can be determined (relative to the reference flat, which is usually assumed to be flat).

The finished etalon assembly cannot be tested with a conventional interferometer because the wavefront error map which is generated represents the relative spacing between the Fizeau reference flat in the interferometer and the cavity of the test etalon. What is needed is a direct measure of the spacing uniformity of the etalon cavity itself.

SUMMARY OF THE INVENTION

The present invention provides a relatively simple etalon testing system and process for measuring cavity error of etalons to high precision. It works equally well on solid and air-spaced designs. This invention should be a great aid in the manufacture of high performance etalons, separating out the geometric and reflectivity finesses. The present invention permits measurement of etalon spacings to an accuracy of better than $\lambda/1000$ (i.e., about 63 picometers [$6.3\times10^{-11}$ m] when using a HeNe test laser). In a preferred process an etalon under examination is mounted on a rotational stage illuminated with a collimated beam from a HeNe laser. Reflections from the etalon are imaged on a screen to produce interference fringes which are monitored by a CCD camera. The etalon is then pivoted about an axis perpendicular to the laser beam and images of the interference patterns are recorded periodically to produce a plot of intensity vs. pivot angle over a pivot range sufficient to include at least one extinction cycle. (Extinction occurs when the etalon is positioned at such an angle that interference in the etalon causes almost complete extinction of the reflected beam). The interference pattern, as a function of pivot angle, are then analyzed to determine the etalon spacing.

BRIEF DESCRIPTION OF THE DRAWINGS

The patent application file contains at least one drawing executed in color. Copies of the patent or patent application publication with color drawing(s) will be provided by the Office upon request and payment of the necessary fee.

DETAILED DESCRIPTION OF A PREFERRED EMBODIMENT

Recent difficulties with the performance of the air-spaced diagnostic etalons purchased by Applicants' employer for use in laser wavemeters have been traced to defective etalon cavity geometries. Examination of these problem etalons has shown that they suffer from non-flat Fabry-Perot plates or wedged cavities (i.e., unequal spacer thickness), or both.

A first preferred embodiment of the present invention for measuring etalon spacing uniformity is a modification of interferometer techniques described in the background section. The reference flat of the Fizeau interferometer is neither needed nor desired, since the etalon forms its own interference cavity. Rather than translating one of the plates, it is more to practical to vary the effective cavity spacing by rotating the etalon over a small angular range. (An air-spaced etalon can also be pressure tuned, but this does not work for solid etalons.) The resulting interference patterns are then analyzed for phase in the usual way, with the exception that the etalon angle is used in place of displacement of the reference flat.

Etalon Setup

Figure 1:
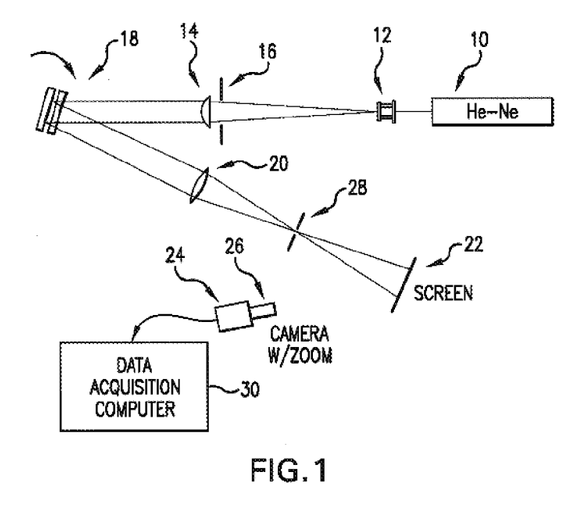
FIG. 1 is a schematic drawing of a preferred embodiment.

A preferred etalon testing system is shown in FIG. 1 is actually a simpler optical arrangement than a standard interferometer system. A conventional He—Ne laser 10 can be used as the source. Since most etalons have relatively small cavity spacings, the He—Ne need not be a single-mode type (however, if the etalon dimension becomes large, a single-mode laser would become necessary). The He—Ne beam is expanded and collimated using a short focal length microscope objective (10×, f=14.8 mm) 12 and a 1 m plano-convex lens 14. An iris 16 just before the collimating lens allows the beam diameter to be adjusted to just fill the etalon clear aperture. The collimated beam then reflects off of test etalon, 18 at a slight angle (about 7° included angle) and is re-imaged by a 25 cm lens 20 onto screen 22. It is important that the etalon cavity be accurately imaged onto the screen, so that the reflected interference pattern does not move when the etalon is rotated. A conventional CCD camera 24, equipped with zoom lens 26, then captures the image on the screen. (The screen can be eliminated in an alternative design by directly imaging the reflected beam onto the CCD.) An aperture 28 located at the focal point of the imaging lens spatially filters out any secondary reflections, such as from the external A/R coated surfaces of the etalon. The etalon is mounted on a motorized rotational stage so that it can be rotated under computer control. (For purposes of this specification and the claims, the phrase "rotational stage" includes a stage which rotates over a range of small angles much less than one complete revolution). In addition, a pitch adjustment is provided so that the reflection can be kept in a plane perpendicular to the axis of the rotational stage (i.e. in the plane of the FIG. 1).

The data acquisition part of the arrangement 30 consists of a computer equipped with a monitor and a frame grabber and running a Labview program. The Labview program steps the rotational stage through a range of angles, grabbing a frame from the camera at each step. It is convenient to absolutely calibrate the rotational angle of the stage, so that the incident angle on the etalon is known for each frame. This is done by manually adjusting the etalon to retroreflect the beam back to the He—Ne source, zeroing out the angle readout within the Labview controller, then keeping track of the rotational angle of the stage as the program runs. Since the physical properties of the etalon (spacing, reflectivity, etc.) are usually well known, the angular range needed to walk the interference pattern through one or two full extinction cycles can be calculated within the program. All that is needed are front panel configurables telling the program the test wavelength (i.e. 632.8 nm) and etalon cavity spacing (nd, which is defined below).

Figure 2:
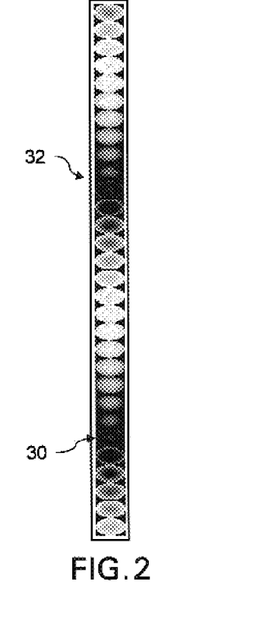
FIG. 2 shows a series of recordings of interference patterns.

A typical sequence of frames is shown in FIG. 2. The etalon angle was stepped through two complete extinction cycles in 30 steps. For this sequence, the incident angle varied from 61.9 to 68.4 mR. A moderate amount of spherical curvature can be seen in the frames near full extinction as shown at 30 and 32 in FIG. 2.

Figure 3:
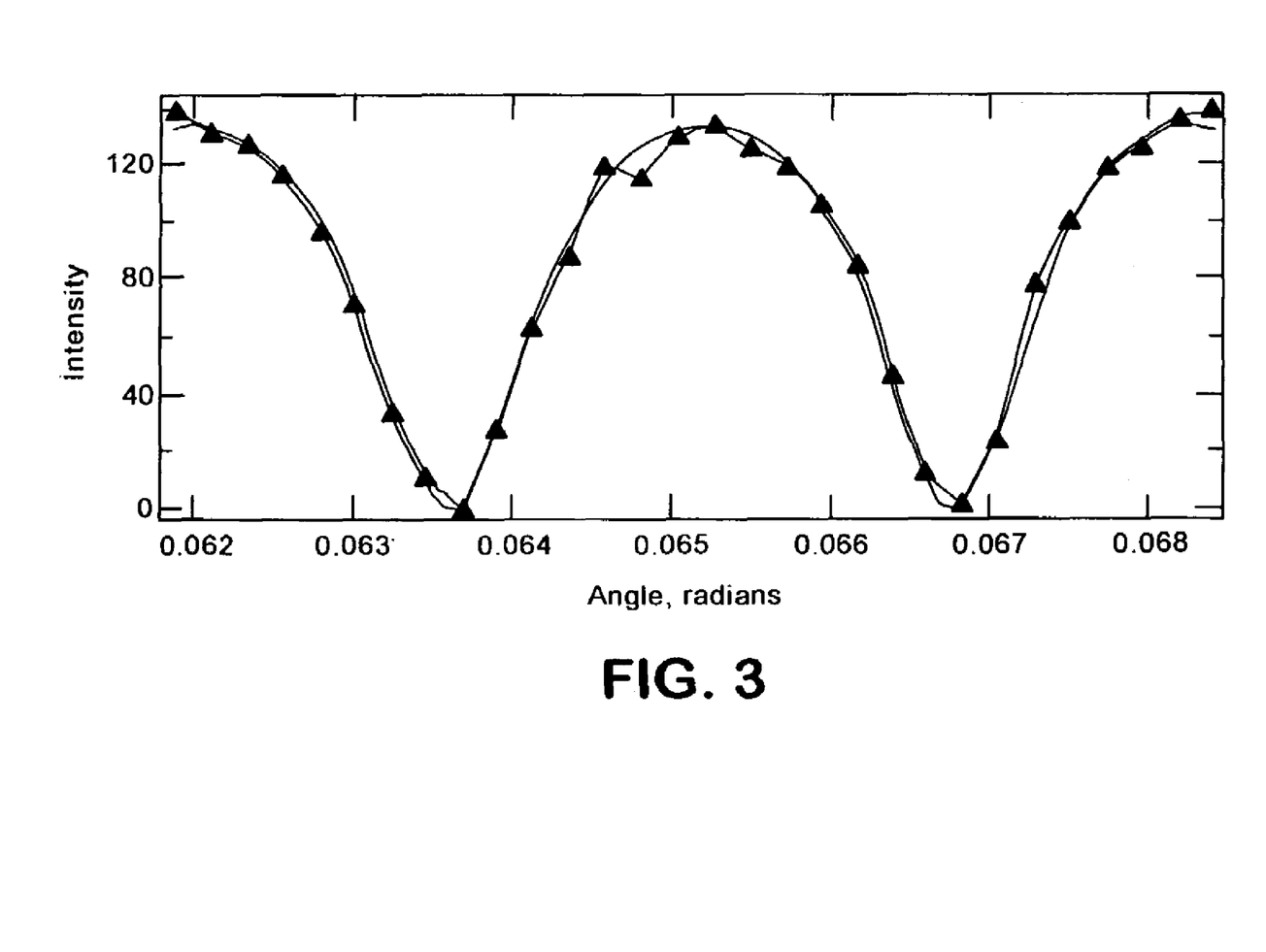
FIG. 3 is a plot of interference pattern intensity from FIG. 2.

If the intensity for any particular pixel is plotted versus frame number (or incident angle) a characteristic interference pattern is seen as shown in FIG. 3 (triangles). The smooth curve is a least-squares fit to an etalon reflectance function described next.

The reflection intensity from an etalon can be found from the usual etalon transmission formula:

$$R = 1 - T = \left[1 + \frac{1}{a \sin^2(\delta)}\right]^{-1} \quad (1)$$

where $$a = \frac{4r_s}{(1-r_s)^2}, \quad \delta = \frac{4\pi nd \cos\theta}{\lambda}$$

$r_s$ is the reflection coefficient at 633 nm for the etalon cavity coatings, nd is the product of cavity index times spacing, $\lambda$ the wavelength (632.8 nm), and $\theta$ the angle of incidence.

For a proof-of-concept experiment, a Labview program exported the frame sequence (FIG. 2 data), along with the frame information (number, size, angles) for analysis by another program (Igor Pro). An analysis routine was written within Igor which performed a pixel by pixel curvefit of the interference pattern (FIG. 3) to the function in equation (1). Four adjustable parameters are required. Since the average etalon spacing nd is well known, the parameter representing the cavity spacing nd was written as the deviation from a nominal value:

$$R(\theta) = c_1 + c_2 \left[1 + \frac{1}{c_3 \sin^2(k(nd + c_4)\cos\theta)}\right]^{-1} \quad (2)$$

where $c_1$ through $c_4$ are the fit coefficients, and $k=4\pi/\lambda$. $C_4$ represents the cavity error, which can be expressed either directly as nm of error, or converted to waves at 633 nm. Since, the expected cavity error is much less than a half-wave, unwrapping of the phase is unnecessary. Piston is normally subtracted from the resulting cavity error map, but tilt is not, since tilt represents a wedged cavity.

Collimation Requirements

Error Attributable to Incident Angle and Slightly Divergent Beam

It's important that the collimated He—Ne be as plane as possible, so that it does not introduce any measurement artifacts. A spherically divergent beam, for instance, will illuminate opposite sides of the etalon at slightly different incident angles, causing a small phase shift in the reflected interference pattern. The etalon cavity would appear wedged and slightly curved, even though it is actually flat. Fortunately, this embodiment is remarkably tolerant to modest errors in the collimated beam.

The error induced in the cavity measurement by a divergent beam can be computed as follows. At full extinction (i.e. no reflection), the etalon transmission is at a maximum, and the etalon equation is satisfied:

2nd $\cos\theta = m\lambda$

For a given order m, the apparent cavity dimension depends on the angle of incidence $$nd = \frac{m\lambda}{2\cos\theta} \quad (3)$$

The sensitivity to variations in incidence angle is found by differentiating (3)

$$\frac{\delta(nd)}{\delta\theta} = nd \tan\theta$$

It can be seen that the sensitivity increases as the incident angle θ increases, and therefor θ should be minimized (it is about 3.5° in FIG. 1) For a λ/10 spherical wavefront error over a 2 cm diameter clear aperture, the full divergence is about 25 μR. Using this angle for δλ, then the apparent change in the cavity spacing from one side of the etalon to the other is (where, nd=1 mm, θ=62 mR):

$$\delta(nd) = \delta\theta \; nd \; \tan\theta \approx 1.5 \; nm \approx \lambda/400$$

A λ/10 error of the interferometer beam translates into a 1.5 nm λ/400 error in the cavity measurement. Note that this tilt appears only in the plane of rotation (i.e. plane of FIG. 1). For the vertical direction, the induced cavity error top to bottom is far smaller, because the vertical divergence of the beam only weakly varies the angle of incidence θ. Calculations similar to the foregoing yield a cavity error (due to the vertical divergence) of 0.08 pm, or $\lambda/8 \times 10^6$. In any event, alignment should be sufficient to collimate the beam to λ/10 or better over the clear aperture of the etalon. For reasonable quality optics, this is very achievable.

Examples of Cavity Error Measurements

Figure 4A:
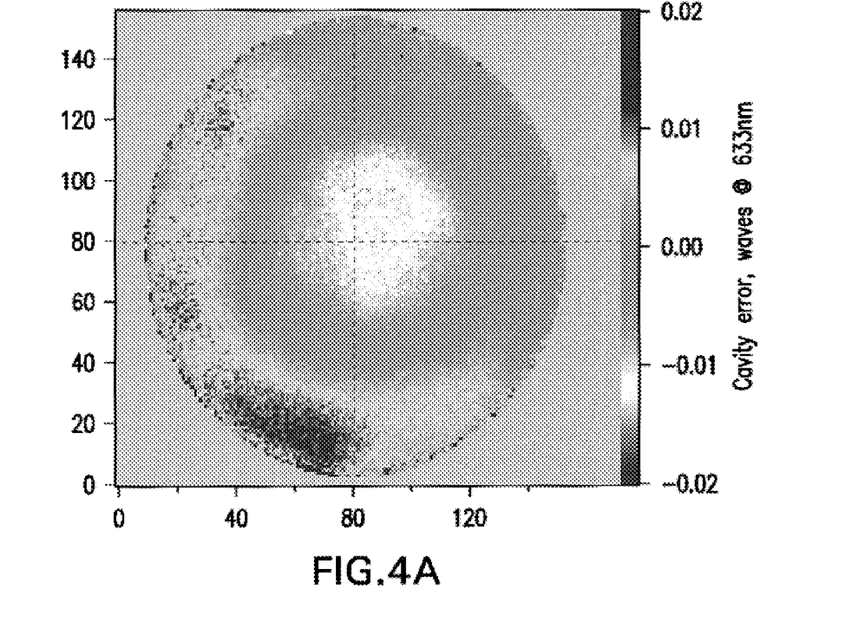
FIGS. 4–7 are interference patterns.
Figure 4B:
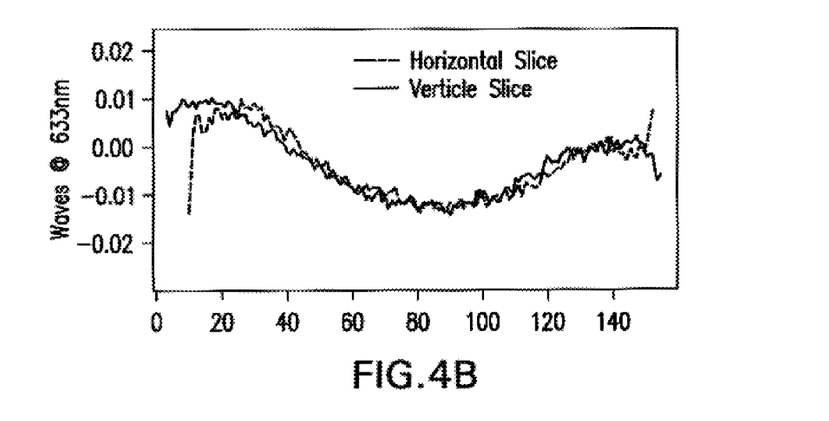

The cavity error extracted from the data of FIG. 2 is shown in FIG. 4A and FIG. 4B. Horizontal and vertical slices through the center (FIG. 4B) reveal that this optic has a 0.022 wave (i.e., 0.22λ or λ/45), radially symmetric spherical curvature, with edge rolloff. Since this interferogram represents the combination of both surfaces, it is impossible to tell whether one or both surfaces are curved. The cavity wedge appears small, hence the geometric finesse of this etalon is dominated by the curvature. Note that the noise level of the measurement is 0.002λ or λ/500.

Figure 5A:
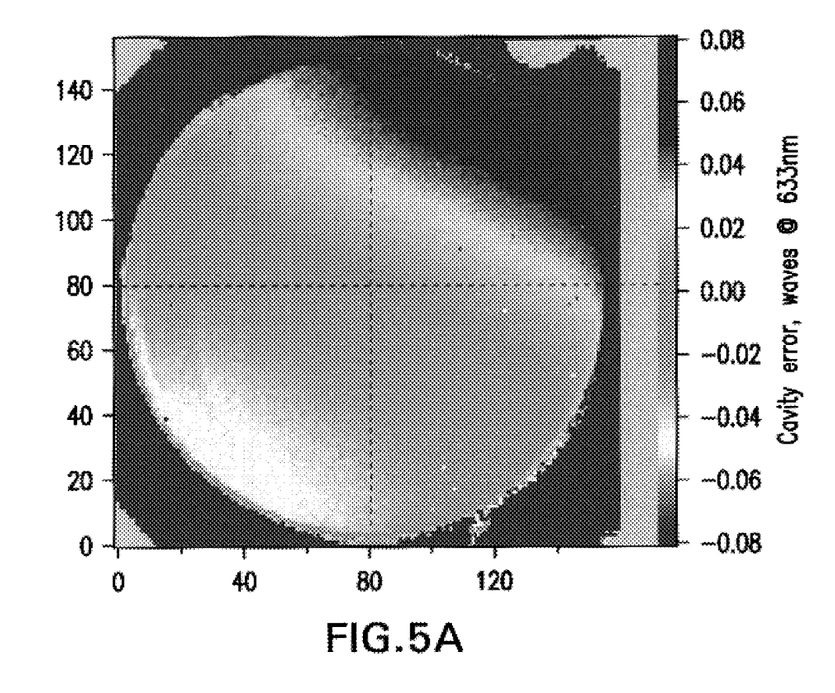
Figure 5B:
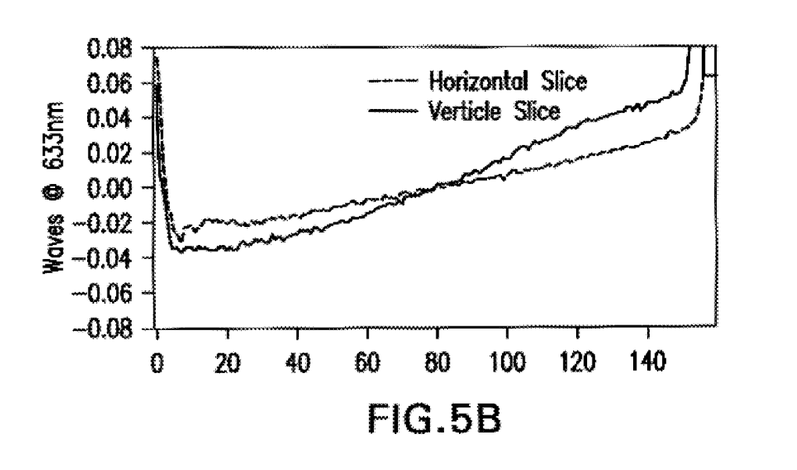

The interferogram for a second etalon, FIGS. 5A and 5B, shows a significant amount of wedge. Adding the horizontal and vertical tilts quadratically, the wedge has a magnitude of about 0.12 wave (λ/8) The plates appear relatively flat; however, this etalon exhibited such poor finesse when installed into an etalon wavemeter that fringes were hardly visible. This was the result of the very large wedge shown in FIG. 5B.

Figure 6A:
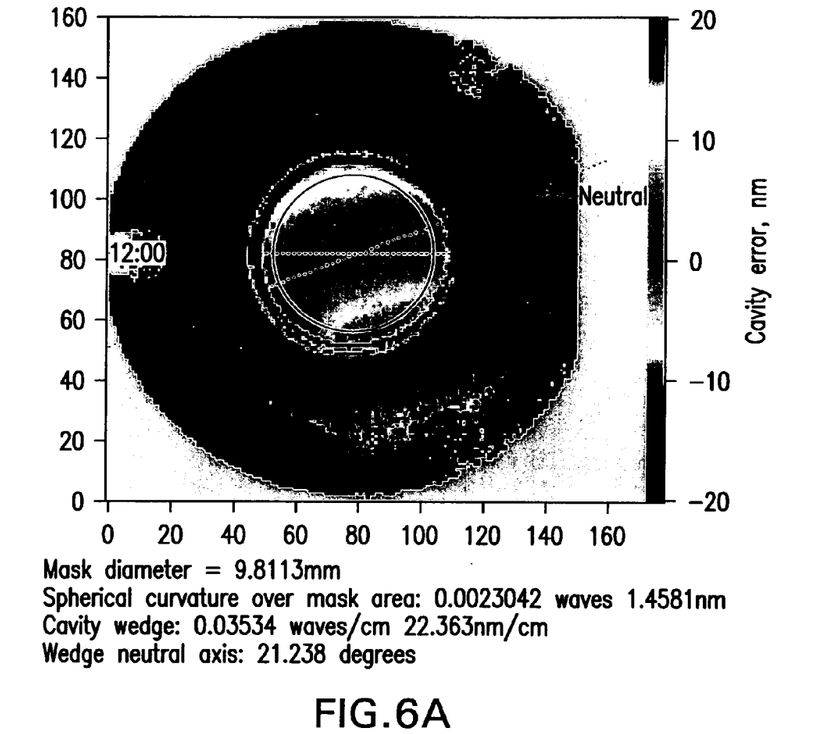
Figure 6B:
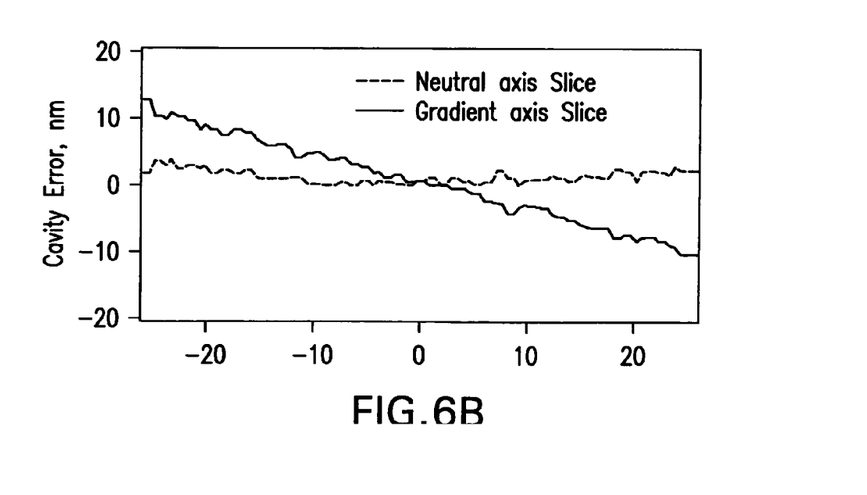

A third etalon's interferogram is shown in FIGS. 6A and 6B. This etalon also exhibited high wedge and poor finesse. Note that the image clearly shows the positions of the three spacers. The high reflectance cavity coating appears as the central colored region.

The plots of FIGS. 6A and 6B has been changed somewhat in the way the cavity information is displayed. First, the color scale is in units of nm of cavity error. Next, the cavity curvature (nm) and wedge (reported as a slope, nm/cm) are printed below the plot, calculated for the data contained within a mask defined by the black circle. This mask has been centered within the clear aperture of the etalon and has a diameter of about 1 cm. The cavity wedge and curvature are calculated by performing a least-squares fit of a tilted, spherical surface to the cavity data within the mask. Next, a dotted line has been added which represents the neutral axis of the wedge, that is, the line of constant cavity dimension. Finally, the slices shown in the lower plot are taken along the neutral axis and a line perpendicular to that axis, the direction of maximum wedge gradient. The gradient slice clearly shows the magnitude of the cavity wedge, while the neutral slice best displays the curvature. The cavity wedge for this etalon is about 22 nm/cm (rather large), and the spherical curvature is about 1.4 nm over the 1 cm mask diameter.

Figure 7A:
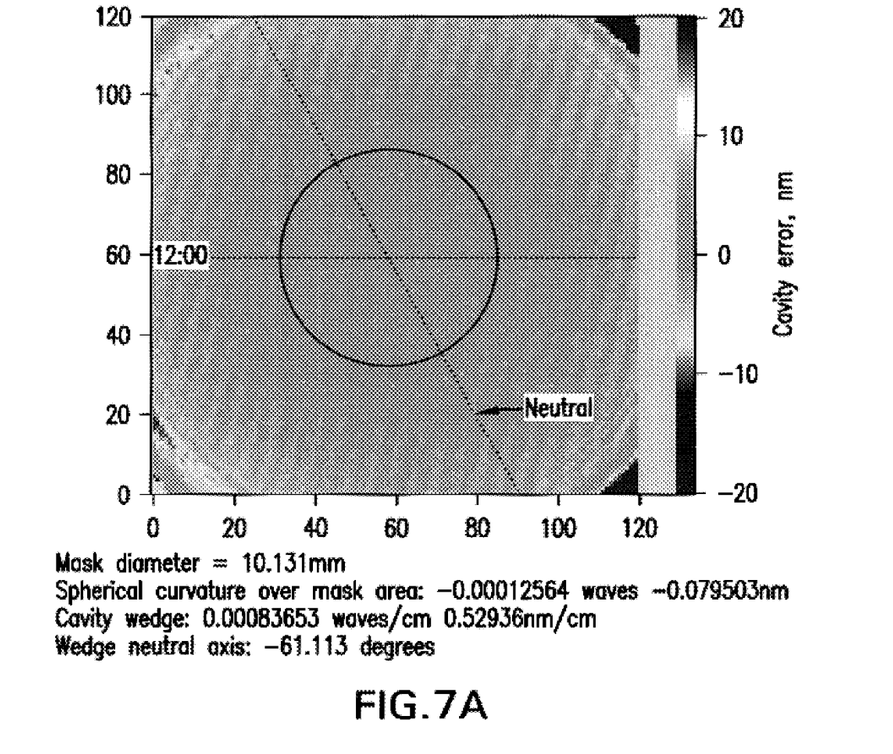
Figure 7B:
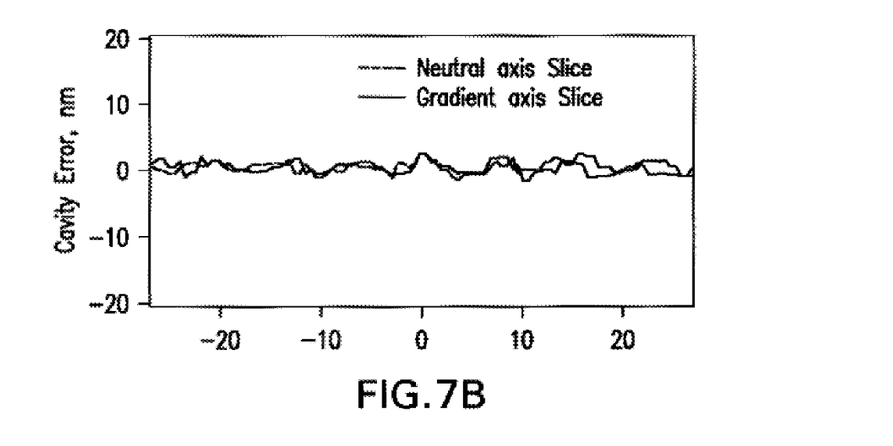

As a final example, the interferogram for a very low wedge etalon is shown in FIGS. 7A and 7B. The reported wedge magnitude and location of the neutral axis are probably dominated by the noise of the measurement. The major source of noise is the interference caused by the A/R surfaces, which can be clearly seen in the interferogram. Even though aperture 15 located after the imaging lens 13 (see FIG. 1) blocks the direct reflection from the A/R surfaces, their effect can still be felt. An interference pattern formed between these two surfaces will modulate the intensity of the main beam reflected off of the etalon cavity. This modulation in amplitude will eventually show up as a phase noise during the curve fitting operation. There are two strategies for eliminating this: (1) construct the etalons so that the A/R surfaces are not so parallel; (2) post process the frame data of FIG. 2 and remove the offending fringe pattern.

Procedure for Making Measurements

The Etalon PMI is intended to measure the geometric accuracy of the optical cavity of both solid and air-spaced plane-parallel etalons. Cavity wedge, sphere, and higher-order deviations from perfect parallelism can be measured. These errors are used to estimate the geometric finesse of the etalon, which, when combined with the reflectivity finesse, yields a total effective finesse. The EPMI operates at a wavelength of 633 nm (He—Ne laser), and can only test etalons whose high-reflectance coatings are substantially transparent at 633 nm (such as etalons used by Cymer which are coated for the ultraviolet).

The cavity errors are obtained by exposing the etalon to a collimated beam and measuring the light reflected from the etalon cavity as it scans through a range of incident angles. Analysis of the reflected intensities as a function of angle yields the cavity error, in much the same way that a conventional Fizeau phase-measuring interferometer works. A full two-dimensional map of the cavity error is retrieved from the data. Because systematic wedge errors can be introduced into the data by certain flaws in the EPMI or the etalon itself, the measurement sequence is done in two steps. First the etalon is measured in a standard orientation, then it is rotated in its mount 180 degrees and measured again. Symmetries in the two sets of data are then exploited to remove the systematic wedge errors.

System Set-Up

The system consists of two major components, (1) a specialized tilt-stage scanning interferometer, and (2) a data-acquisition computer and printer.
1. Place the interferometer on a stable table in a clean area. Subdued lighting is necessary for proper camera operation.
2. Set up the computer in a convenient location near the interferometer, close enough for the video coax cable to reach the camera.
3. Hook up power and cabling.

An analysis screen within computer 30 receives cavity error data generated on the main screen, also displayed on the computer 30 monitor, corrects it for systematic errors, and performs surface fitting to the data. Wedge slope, sphere, and the orientation of the gradient axis are reported. In addition, an estimate of the effective total finesse is displayed. This screen is used to print out a report of the performance of the etalon under test.

Measurement Sequence

The basic measurement procedure starts by inserting the test etalon in a specific orientation into its holder to the tilt stage. Next, the tilt stage controls are used to retroreflect the light from the etalon cavity back towards the laser. This aligns the etalon to the collimated beam, and defines the zero incident angle. The user then pushes a button which informs the program that the etalon angle is normal to the incoming beam. The tilt stage then automatically moves to the "standard angle", a small (40–45 mrad) angular offset built into the layout of the tester. This offset angle is needed to allow the reflected beam to clear the path of the incoming beam. Once at the standard angle, the user initiates a scan by pushing a different button. The tilt stage starts scanning the etalon through a series of discrete angles around the standard angle. At each angle, the camera captures an image of the reflected light, which contains information about the etalon cavity. Once the scan is completed, the video data is processed and the cavity error is computed for each point on the etalon surface.

The foregoing sequence is repeated once more after the etalon is rotation 180 degrees in its mount around the cylindrical axis: align retroreflection, reset zero, go to standard angle, scan. The two resulting cavity error maps, one at 0 degrees and another at 180 degrees, are then used in the analysis panel to compute the true etalon cavity error. Preferably control buttons on the computer monitor screen are programmed to lead the user through this multi-step procedure through prompts and visual cues.

Two Measurement Cavity Computation

The following is a preferred simple procedure for computing the true etalon cavity:
1. Measure the etalon at a starting orientation (arbitrary), rotate it 180 degrees around the cylindrical axis and measure again. Call the two files "0" and "180".
2. Form a file which is ½ the sum of the two: ("0"+"180")/2.
3. Perform a surface fit to ("0"+"180")/2 and find the x-axis wedge. The x axis is in the plane of rotation of the etalon during the PMI scan.
4. Form a file which is the sum file ("0"+"180")/2 with the x-axis wedge removed. Call this file [("0"+"180")/2]x=0.
5. Form a file which is the difference of the two files. Call this ("0"−"180")/2
6. Add ("0"−"180")/2+[("0"+"180")/2]x=0. This produces the final result which is a true measure of the etalon cavity error.

While the above invention has been described in terms of preferred embodiments, persons skilled in the optics art will recognize there are many obvious variations of the described embodiments which could be utilized. Therefore, the scope of the invention should be determined by the claims and their legal equivalents and not by the above described embodiments.

I claim:
1. A method for testing etalons comprising the steps of:
  A. mounting an etalon defining a test etalon on a stage,
  B. illuminating said test etalon with a collimated laser beam,
  C. detecting interference fringes in light reflected from the test etalon at a plurality of etalon rotation positions sufficient to include at least one extinction cycle,
  D. analyzing selected interference patterns to estimate uniformity of etalon spacing.
2. A method as in claim 1 wherein said collimated beam is configured to illuminate said test etalon at angles in the range of about 3.5 degrees.
3. A method as in claim 1 wherein said collimated beam has a spherical wavefront error of less than 23 μR.
4. A method as in claim 1 wherein said collimated beam has a wavefront error of less than $\lambda/10$.
5. A method as in claim 1 wherein said fringes are detected by imaging fringes on a screen.
6. A method as in claim 5 wherein images on said screen are detected with a CCD camera.
7. A method as in claim 1 wherein said fringes are imaged directly on pixels of a CCD camera.
8. A method as in claim 1 wherein said test etalon is stepped through a plurality of angles and interference patterns are recorded at each of said plurality of angles using a controller comprising a digital processor programmed to keep track of pattern data and rotation angles.
9. A method as in claim 8 wherein said etalon is stepped through at least two extension cycles.
10. A system for testing etalons comprising:
  A. a rotational stage,
  B. a mounting means for mounting a test etalon on said rotational stage,
  C. a laser light source for producing a coherent light source,
  D. collimating optics for collimating said light source to produce a collimated beam for illuminating said test etalon,
  E. a detector for detecting interference patterns in light reflected from said test etalons,
  F. a control means to provide precision rotation of said test etalon on said rotation stage and for recording said interference patterns at each of a plurality of rotation positions wherein said control means comprises a digital processor for analyzing said interference patterns to indicate extent of uniformity of etalon spacing.

* * * * *